(12) United States Patent
Yamanaka et al.

(10) Patent No.: US 10,138,355 B2
(45) Date of Patent: Nov. 27, 2018

(54) FLAME-RETARDANT RESIN COMPOSITION AND MOLDED ARTICLE PRODUCED FROM SAME

(71) Applicant: TEIJIN LIMITED, Osaka (JP)

(72) Inventors: Katsuhiro Yamanaka, Osaka (JP); Tsuyoshi Takeda, Osaka (JP); Kenta Imazato, Osaka (JP)

(73) Assignee: TEIJIN LIMITED, Osaka (JP)

( * ) Notice: Subject to any disclaimer, the term of this patent is extended or adjusted under 35 U.S.C. 154(b) by 0 days.

(21) Appl. No.: 15/544,651

(22) PCT Filed: Jan. 19, 2016

(86) PCT No.: PCT/JP2016/051426
§ 371 (c)(1),
(2) Date: Jul. 19, 2017

(87) PCT Pub. No.: WO2016/117552
PCT Pub. Date: Jul. 28, 2016

(65) Prior Publication Data
US 2018/0009967 A1    Jan. 11, 2018

(30) Foreign Application Priority Data
Jan. 23, 2015    (JP) .................................. 2015-011371

(51) Int. Cl.
C08K 5/5357    (2006.01)
C08L 33/04    (2006.01)

(52) U.S. Cl.
CPC ............ C08K 5/5357 (2013.01); C08L 33/04 (2013.01)

(58) Field of Classification Search
CPC .... C08K 5/5357; C08K 5/5373; C07F 9/4056
USPC ............... 524/120; 252/400.23; 987/154, 44; 508/422; 44/378
See application file for complete search history.

(56) References Cited

U.S. PATENT DOCUMENTS 3,839,506 A * 10/1974 Hechenbleikner et al. ................. C07F 9/4056 558/77
2011/0160366 A1    6/2011 Kim et al.
2015/0038036 A1    2/2015 Yamanaka et al.

FOREIGN PATENT DOCUMENTS

| JP | 56-68106 | 6/1981 |
|----|----------|--------|
| JP | 57-159087 | 10/1982 |
| JP | 59-206454 | 11/1984 |
| JP | 5-170996 | 7/1993 |
| JP | 6-32841 | 2/1994 |
| JP | 8-193187 | 7/1996 |
| JP | 2002-3728 | 1/2002 |
| JP | 2004-18765 | 1/2004 |
| JP | 2010-95731 | 4/2010 |
| JP | 2011-503318 | 1/2011 |
| JP | 2012-12566 | 1/2012 |
| JP | 2014-101514 | 6/2014 |
| WO | 2013/147294 | 10/2013 |

OTHER PUBLICATIONS

International Search Report dated Apr. 19, 2016 in International (PCT) Application No. PCT/JP2016/051426.
Communication pursuant to Article 94(3) EPC dated Mar. 8, 2018 in European Application No. 16 740 159.5.
Extended European Search Report dated Dec. 13, 2017 in European Application No. 16740159.5.
Office Action dated Aug. 7, 2018 in Japanese Application No. 2016-570650, with English translation.

* cited by examiner

*Primary Examiner* — William K Cheung
(74) *Attorney, Agent, or Firm* — Wenderoth, Lind & Ponack, L.L.P.

(57) ABSTRACT

A flame retardant resin composition containing 1 to 100 parts by weight of (B) an organophosphorus compound (component B) represented by the following formula (1) per 100 parts by weight of (A) a resin component (component A) containing at least 60 wt % of an acrylic resin has high flame retardancy, high transparency and satisfactory physical properties:

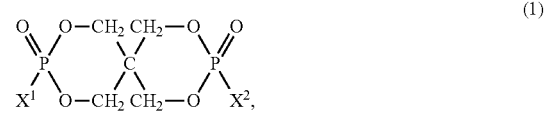

(1)

wherein $X^1$ and $X^2$ are the same or different, and represent alkyl groups substituted with aromatic groups represented by the following formula (2):

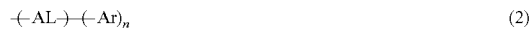

(2)

wherein AL represents a branched or linear aliphatic hydrocarbon group having 1 to 5 carbon atoms, Ar represents a phenyl group, a naphthyl group, or an anthryl group each optionally substituted, n represents an integer of 1 to 3, and Ar can be bonded to any carbon atom in AL.

5 Claims, No Drawings

FLAME-RETARDANT RESIN COMPOSITION AND MOLDED ARTICLE PRODUCED FROM SAME

This application is a national stage of PCT International Application No. PCT/JP2016/051426 filed in Japan on Jan. 19, 2016, which claims priority to and incorporates by reference the entire contents of Japanese Patent Application No. 2015-011371 filed in Japan on Jan. 23, 2015.

TECHNICAL FIELD

The present invention relates to a transparent flame-retardant acrylic resin composition having high flame retardancy and satisfactory physical properties and to a molded article from the composition. More specifically, the present invention relates to a transparent flame-retardant acrylic resin composition that contains a specific organophosphorus compound and is substantially halogen-free and to a molded article from the composition.

BACKGROUND ART

Acrylic resins generally have excellent characteristics such as high transparency, high weather resistance, high hardness, ease of processing and the like, and are used for wide applications such as automotive parts, building materials, electrical/electronic products, furniture, vehicles, ornaments, and the like. However, acrylic resins have high flammability, easily ignite and flare up, and thus lead to rapid spread of flame and cause considerable damage. Accordingly, their uses have been limited. Acrylic resins also have a disadvantage of emitting toxic monomers during combustion, and imparting flame retardancy to acrylic resins is desired.

As methods for imparting flame retardancy to acrylic resins, methods including adding a halogen compound or a phosphate compound (PTL 1 and PTL 2) are known. Additionally, a method for imparting flame retardancy in which a halogen compound and a phosphorus compound are added to acrylic resins has been reported, such as a method including using an acrylic resin in combination with a brominated epoxy resin and a phosphorus compound (PTL 3) and a method including using a halogenated phosphate ester (PTL 4). Meanwhile, it is known that even a small amount of halogen makes an effect when an acrylic resin is crosslinked with a brominated acrylic acid compound (PTL 5).

In recent years, techniques for imparting flame retardancy without using a halogen-based flame retardant have been demanded from the viewpoint of environmental problems such as toxic gas emission during combustion. In addition to the aforementioned phosphate compound, a method including combination of red phosphorus with a nitrogen-containing phosphorus compound (PTL 6) has been reported. Additionally, a method for obtaining a flame-retardant acrylic resin by copolymerizing an acrylate monomer and a phosphorus-containing monomer (PTL 7) has been reported. However, in the range of the conventional art, issues are remaining such as insufficient flame retardancy and impairment of transparency, which is a feature of acrylic resins. The only technique that can satisfy both transparency and high flame retardancy was a technique for copolymerizing (an acrylic monomer and) a phosphorus-containing monomer. In such a technique for flame retardancy by copolymerization, it is not easy to adjust the amount of the flame retardant component to be added for achieving desired flame retardant performance. Moreover, for the development of a resin composition with a purpose of improving the physical properties by use of other components to be added, adjustment of the amount of the flame retardant component to be added is required, and a technique for imparting flame retardancy with an addition-type flame retardant has been demanded. In other words, no method has been suggested so far for obtaining a flame retardant acrylic resin having an excellent balance among mechanical strength, surface hardness, flame retardancy, transparency and the like by adding a non-halogen flame retardant not by copolymerization but by melt kneading.

Meanwhile, a method for imparting high flame retardancy by adding an organophosphorus compound to a styrene resin (PTL 8) has been reported, but there was no mention of a technique to impart high flame retardancy while retaining transparency of the acrylic resin.

CITATION LIST

Patent Literature

[PTL 1] Japanese Unexamined Patent Application Publication No. 5-170996

[PTL 2] Japanese Unexamined Patent Application Publication No. 56-68106

[PTL 3] Japanese Unexamined Patent Application Publication No. 57-159087

[PTL 4] Japanese Unexamined Patent Application Publication No. 59-206454

[PTL 5] Japanese Unexamined Patent Application Publication No. 6-32841

[PTL 6] Japanese Unexamined Patent Application Publication No. 8-193187

[PTL 7] Japanese Unexamined Patent Application Publication No. 2014-101514

[PTL 8] Japanese Unexamined Patent Application Publication No. 2010-95731

SUMMARY OF INVENTION

Technical Problem

A first object of the present invention is to provide a flame-retardant acrylic resin composition having high flame retardancy, high transparency and satisfactory physical properties, and a molded article from the composition.

A second object of the present invention is to provide a flame-retardant acrylic resin composition that contains a specific organophosphorus compound and is substantially halogen-free, and a molded article from the composition.

Solution to Problem

According to the study of the present inventors, the above-mentioned object of the present invention is achieved by a flame retardant resin composition containing 1 to 100 parts by weight of (B) an organophosphorus compound (component B) presented by the following formula (1) per 100 parts by weight of (A) a resin component (component A) containing at least 60 wt % of an acrylic resin, and a molded article from the composition.

[Chem. 1]

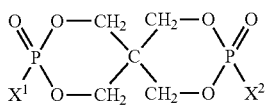

(1)

(wherein $X^1$ and $X^2$ are the same or different and represent alkyl groups substituted with aromatic groups represented by the following formula (2).)

[Chem. 2]

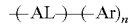

(2)

(wherein AL represents a branched or straight aliphatic hydrocarbon group having 1-5 carbon atoms, and Ar, represents a phenyl group, a naphthyl group, or an anthryl group each optionally substituted. The symbol n represents an integer of 1 to 3, and Ar can be bonded to any carbon atom in AL.)

Advantageous Effects of Invention

The flame-retardant resin composition of the present invention and the molded article molded from the composition can achieve the following advantages compared with conventional acrylic resin compositions.
(i) An acrylic resin composition having high flame retardancy is obtained substantially without using a halogen-containing flame retardant.
(ii) An organophosphorus compound as a flame retardant has an excellent flame retardant effect on the acrylic resin, and thus can achieve the V-2 level even with a relatively small use amount.
(iii) Due to the structure and characteristics of the organophosphorus compound used as a flame retardant, a composition having an excellent balance between flame retardancy and mechanical strength is obtained without reducing the inherent physical properties of the acrylic resin.
(iv) Since an organophosphorus compound as a flame retardant is colorless and compatible with the acrylic resin, molded articles having excellent transparency can be obtained.

DESCRIPTION OF EMBODIMENTS

A flame-retardant resin composition of the present invention is further explained as follows.

As for resin components in the present invention, acrylic resin preferably accounts for a main component among the constituting resin components (component A), and acrylic resin (component A-1) is at least 60 wt %, preferably at least 65 wt %, more preferably at least 70 wt %, further preferably at least 80 wt %, particularly preferably at least 90 wt %, and most preferably 100 wt %. In component A, the amount of other resins (component A-2) may be 40 wt % or less, preferably 35 wt % or less, more preferably 30 wt % or less, further preferably 20 wt % or less, and particularly preferably 10 wt % or less. The details of other resins are explained later.

Though the acrylic resin (component A-1) in constituting resin components (component A) of the present invention is not limited in particular, the acrylic resin preferably has a melt flow rate of 0.5-30 g/10 min measured at 230° C. under a load of 3.8 kg according to JIS K7210, more preferably melt flow rate of 0.7-27 g/10 min, and further preferably melt flow rate of 1.0-25 g/10 min. An acrylic resin having a melt flow rate within the range exerts good formability, thus providing a flame-retardant resin composition of the present invention with good formability.

Examples of a monomer used as a raw material to obtain component (A-1) include acrylic monomers of (meth)acrylic esters such as methyl (meth)acrylate, ethyl (meth)acrylate, n-butyl (meth)acrylate, i-butyl (meth)acrylate, t-butyl (meth)acrylate, hexyl (meth)acrylate, 2-ethylhexyl (meth) acrylate, octyl (meth)acrylate, phenyl (meth)acrylate and cyclohexyl (meth)acrylate, or (meth)acrylic acid.

Component (A-1) used in the present invention may contain, as a copolymerization component, an aromatic vinyl monomer such as styrene and α-methyl styrene, and a vinyl monomer such as acrylonitrile, maleic anhydride, anhydrous glutaric acid and glutarimide, and may be a binary, ternary or quaternary copolymer of these monomers, as needed. Furthermore, those enforced by an elastomer component such as an acrylic rubber and a butadiene rubber may be used.

Furthermore, in the present invention, a crosslinking agent can be contained in the above-mentioned monomer as needed. Examples of the crosslinking agent include (poly) ethylene glycol di(meth)acrylate, propylene glycol di(meth) acrylate, 1,6-hexanediol di(meth)acrylate, trimethylolpropane tri(meth)acrylate and allyl methacrylate.

A polymerization method of components (A-1) is not limited in particular, and includes a well-known polymerization method.

The constituting resin (component A) of the present invention may contain other thermoplastic resin (component A-2) in addition to the above acrylic resin (component A-1).

Thermoplastic resin of component A-2 includes at least one selected from a group consisting of polyester resin (PEst), polyphenylene ether resin (PPE), polycarbonate resin (PC), polyamide resin (PA), polyolefin resin (PO), styrenic resin, polyphenylene sulfide resin (PPS) and polyetherimide resin (PEI). Among these components A-2, preferable are polyester resin (PEst), polyphenylene ether resin (PPE), polycarbonate resin (PC), polyamide resin (PA), polyolefin resin (PO) and styrenic resin.

The thermoplastic resin of component A-2 is explained in detail as follows.

Polyester resin (PEst) of component A-2 includes a mixture of one kind or two kinds or more selected from aromatic polyester resins or aliphatic polyester resins. Aromatic polyester resin is preferable, and is polyester having aromatic dicarboxylic acid as main dicarboxylic acid component and aliphatic diol having 2-10 carbon atoms as a main glycol component. An aromatic dicarboxylic acid component is preferably 80 mol % or more of the dicarboxylic acid component and more preferably 90 mol % or more. On the other hand, an aliphatic diol component having 2-10 carbon atoms is preferably 80 mol % or more of the glycol component and more preferably 90 mol % or more.

Preferable examples of the aromatic dicarboxylic acid component include terephthalic acid, isophthalic acid, phthalic acid, methyl terephthalic acid, methyl isophthalic acid, 2,6-naphthalenedicarboxylic acids, and the like. One kind or two kinds or more of these can be used. Examples of a subordinate dicarboxylic acid other than an aromatic dicarboxylic acid include an aliphatic or alicyclic dicarboxylic acid such as adipic acid, sebacic acid, decane dicarboxylic acid, azelaic acid, dodecane dicarboxylic acid, cyclohexanedicarboxylic acid and the like.

Examples of an aliphatic diol having 2-10 carbon atoms include an aliphatic diol such as ethylene glycol, trimethylene glycol, tetramethylene glycol, hexamethylene glycol and neopentylglycol, and an alicyclic diol such as 1,4-cyclohexanedimethanol. Examples of a glycol other than an aliphatic diol having 2-10 carbon atoms include p,p'-dihydroxyethoxybispenol A, polyoxyethylene glycol and the like.

Preferable examples of the aromatic polyester resin include a polyester having an ester unit composed of at least one kind of dicarboxylic acid as the main dicarboxylic acid component selected from terephthalic acid and 2,6-naphthalenedicarboxylic acids, and at least one kind of diol as the main diol component selected from ethylene glycol, trimethylene glycol and tetramethylene glycol.

The specific aromatic polyester resin is preferably at least one kind selected from a group consisting of polyethylene terephthalate resin, polybutylene terephthalate resin, polyethylene naphthalate resin, polybutylene naphthalate resin, polycyclohexane dimethyl terephthalate resin, polytrimethylene terephthalate resin and polytrimethylene naphthalate resin.

Particularly preferable is at least one kind selected from a group consisting of polyethylene terephthalate resin, polybutylene terephthalate resin and polyethylene naphthalate resin. Polybutylene terephthalate resin is particularly preferable among these.

In the aromatic polyester resin of the present invention, a polyester elastomer also can be used which has the above-mentioned repeat unit as a main repeat unit of the hard segment.

For a soft segment in the polyester elastomer which contains tetramethylene terephthalate or tetramethylene-2,6-naphthalene dicarboxylate as a main repeat unit of the hard segment, for example, there can be used those composed of a dicarboxylic acid component which is at least one kind of dicarboxylic acid selected from terephthalic acid, isophthalic acid, sebacic acid and adipic acid, and a diol component which is at least one kind of diol selected from, a group consisting of a long-chain diol having 5-10 carbon atoms and $H(OCH_2CH_2)_iOH$ (i=2-5), and further those having a melting point of 100° C. or lower and composed of amorphous polyester or polycaprolactone.

Here, the main component means a component accounting for 80 mol % or more of all dicarboxylic acid components or all glycol components, and preferably 90 mol % or more. The main repeat unit means a repeat unit accounting for 80 mol % or more of all repeat units, preferably 90 mol % or more.

As for the molecular weight of the aromatic polyester resin of the present invention, intrinsic viscosity usually usable as a molded article is sufficient, and the inherent viscosity measured in orthoclorophenol at 35° C. is preferably 0.5-1.6 dl/g and more preferably 0.6-1.5 dl/g.

In addition, the aromatic polyester resin has advantageously a terminal carboxyl group (—COOH) amount of 1-60 equivalent/T (1 ton of polymer). The terminal carboxyl group amount can be determined, for example, by potentiometric titration of a m-cresol solution with an alkaline solution.

For polyphenylene ether resin as component A-2, those commonly known as PPE resin can be used. Specific examples of, such PPE include a homopolymer and/or copolymer of (2,6-dimethyl-1,4-phenylene) ether, (2,6-diethyl-1,4-phenylene) ether, (2,6-dipropyl-1,4-phenylene) ether, (2-methyl-6-ethyl-1,4-phenylene) ether, (2-methyl-6-propyl-1,4-phenylene) ether, (2,3,6-trimethyl-1,4-phenylene) ether, and particularly preferably poly(2,6-dimethyl-1,4-phenylene ether). A copolymer formed by graft polymerization of a styrene compound to a PPE may also be used. The manufacturing method of such PPE is not particularly limited and, for example, the PPE can be produced easily by oxidation polymerization of 2,6-xylenol using a complex of a cuprous salt and amines as a catalyst according to the method described in U.S. Pat. No. 3,306,874.

Reduced viscosity ηsp/C (0.5 g/dl, toluene solution, measurement at 30° C.), which is a measure of the molecular weight of PPE resin, is preferably 0.2-0.7 dl/g, and more preferably 0.3-0.6 dl/g. In the PPE resin having reduced viscosity within this range, molding workability and mechanical property are in good balance. The reduced viscosity can be tuned easily by adjusting the amount of catalyst and the like at PPE production.

The polycarbonate resin (PC) as component A-2 includes those obtained by an interfacial polymerization reaction of various kinds of dihydroxyaryl compounds and phosgene using a solvent such as methylene chloride, or those obtained by a transesterification reaction of a dihydroxyaryl compound and a diphenyl carbonate. Typical example is a polycarbonate obtained by the reaction of 2,2'-bis(4-hydroxyphenyl)propane and phosgene.

A dihydroxy aryl compound used as a raw material of the polycarbonate includes bis(4-hydroxyphenyl)methane, 1,1'-bis(4-hydroxyphenyl)ethane, 2,2'-bis(4-hydroxyphenyl)propane, 2,2'-bis(4-hydroxyphenyl)butane, 2,2'-bis(4-hydroxyphenyl)octane, 2,2'-bis(4-hydroxy-3-methylphenyl)propane, 2,2'-bis(4-hydroxy-3-t-butylphenyl)propane, 2,2'-bis(3,5-dimethyl-4-hydroxyphenyl)propane, 2,2'-bis(4-hydroxy-3-cyclohexylphenyl)propane, 2,2'-bis(4-hydroxy-3-methoxyphenyl)propane, 1,1'-bis(4-hydroxyphenyl)cyclopentane, 1,1'-bis(4-hydroxyphenyl)cyclohexane, 1,1'-bis(4-hydroxyphenyl)cyclododecane, 4,4'-dihydroxyphenyl ether, 4,4'-dihydroxy-3,3'-dimethylphenyl ether, 4,4'-dihydroxydiphenyl sulfide, 4,4'-dihydroxy-3,3'-dimethyldiphenylsulfide, 4,4'-dihydroxydiphenylsulfoxide, 4,4'-dihydroxydiphenylsulphone, bis(4-hydroxyphenyl)ketone and the like. These dihydroxy aryl compounds can be used singly or in combination of two kinds or more.

The dihydroxy aryl compound preferably includes bisphenols that form highly heat-resistant aromatic polycarbonates, bis(hydroxyphenyl) alkane such as 2,2'-bis(4-hydroxyphenyl)propane, bis(hydroxyphenyl)cycloalkane such as bis(4-hydroxyphenyl)cyclohexane, dihydroxydiphenylsulfide, dihydroxydiphenylsulphone, dihydroxydiphenyl ketone and the like. The dihydroxy aryl compound preferably in particular is 2,2'-bis(4-hydroxyphenyl)propane which forms a bisphenol A type aromatic polycarbonate.

Note that, when bisphenol A type aromatic polycarbonates are prepared, a part of the bisphenol A may be substituted with other dihydroxy aryl compounds to an extent that does not impair heat resistance, mechanical strength and the like.

The molecular weight of the polycarbonate resin is not necessarily limited in particular. When the molecular weight is too low, the strength is insufficient, and when the molecular weight is too high, the melt viscosity increases and molding becomes difficult. Thus, the molecular weight, expressed in the viscosity average molecular weight, is usually 10,000 to 50,000 and preferably 15,000 to 30,000. The viscosity average molecular weight (M) referred to herein is a value determined by assigning a specific viscosity ($\eta_{sp}$), determined from a solution obtained by dissolving 0.7 g of polycarbonate resin in 100 ml of methylene chloride at 20° C., in the following expression.

$$\eta_{sp}/C=[\eta]+0.45\times[\eta]^2 C$$

$$[\eta]=1.23\times10^{-4}M^{0.83}$$

(wherein [η] is the limiting viscosity, and C is a polymer concentration of 0.7.)

A basic procedure to produce a polycarbonate resin will be briefly described. In an interfacial polymerization method (solution polymerization method) which employs phosgene as a carbonate precursor, the reaction is carried out usually in the presence of an acid binding agent and an organic solvent. As the acid binding agent, an alkali metal hydroxide such as sodium hydroxide and potassium hydroxide, or an amine compound such as pyridine is used. As the organic solvent, a halogenated hydrocarbon such as methylene chloride and chlorobenzene is used. To promote the reaction, for example, a catalyst such as tertiary amines and quaternary ammonium salts can be used. As the molecular weight modifier, for example, a terminating agent such as phenol or alkyl-substituted phenols including p-tert-butyl phenol is desirably used. It is preferred to usually maintain a reaction temperature of 0 to 40° C., a reaction time of several minutes to 5 hours, and a pH of 10 or more during the reaction. It should be noted that all the molecular chain ends obtained do not necessarily have a structure derived from the terminating agent.

A transesterification reaction (melt polymerization method) using a diester carbonate as a carbonate precursor is carried out by a method including stirring a dihydric phenol and the diester carbonate in a predetermined ratio under heating in the presence of an inert gas and distilling out the alcohol or phenol formed. The reaction temperature, which depends on the boiling point of the formed alcohol or phenols, is generally 120 to 350° C. The reaction is conducted under a reduced pressure from the beginning and allowed to complete while distilling off the alcohol or phenols formed. A terminating agent is added in the initial stage of the reaction together with the dihydric phenol and the like, or in the intermediate stage of the reaction. In order to promote the reaction, a catalyst used in a currently-known transesterification reaction also can be used. Examples of the diester carbonate used for the transesterification reaction includes diphenyl carbonate, dinaphthyl carbonate, dimethyl carbonate, diethyl carbonate, dibutyl carbonate and the like. Among these, diphenyl carbonate is preferable in particular.

Examples of the polyamide resin (PA) as component A-2 include ring-opened polymer of cyclic lactams, polymer of aminocarboxylic acid, polycondensate of dibasic acid and diamine, and the like, and specifically include aliphatic polyamide such as nylon 6, nylon 66, nylon 46, nylon 610, nylon 612, nylon 11 and nylon 12, aliphatic-polyamide such as poly(meta-xylene adipamide), poly(hexamethylene terephthalamide), poly(nonamethylene terephthalamide), poly(hexamethylene isophthalamide), poly(tetramethylene isophthalamide) and the like, and copolymers and mixtures thereof. Polyamides which can be used for the present invention is not limited in particular.

Though the molecular weight of the polyamide resin is not limited in particular, the resin having a relative viscosity, which is measured at a concentration of 1%, at 25° C. in 98% sulfuric acid, of 1.7-4.5 can be used, preferably 2.0-4.0, and preferably in particular 2.0-3.5.

Polyolefin resin as component A-2 is a homopolymer or copolymer of olefins such as ethylene, propylene, butane and the like or a copolymer of the olefin with a monomer component that can be copolymerized with the olefins. Specifically, included are polyethylene, polypropylene, ethylene-vinyl acetate copolymer, ethylene-ethyl acrylate copolymer, ethylene-acrylic acid copolymer, ethylene-methyl methacrylate copolymer, ethylene-α-olefin copolymer, ethylene-propylene copolymer, ethylene-butene copolymer and the like. Though the molecular weight of the polyolefin resin is not limited in particular, flame-retardancy becomes better as the molecular weight is higher.

The styrenic resin as component A-2 is a homopolymer or copolymer of an aromatic vinyl monomer such as styrene, α-methyl styrene or vinyltoluene, a copolymer of these monomers with vinyl monomer such as acrylonitrile, methylmethacrylate and the like, and those formed by graft polymerization of diene rubber such as polybutadiene and the like, ethylene-propylene rubber, acrylic rubber and the like with styrene and/or styrene derivative, or styrene and/or styrene derivative and other vinyl monomers. Specific examples of the styrenic resin include resin such as polystyrene, high-impact polystyrene (HIPS), acrylonitrile-styrene copolymer (AS resin), acrylonitrile-butadiene-styrene copolymer (ABS resin), methyl methacrylate-butadiene-styrene copolymer (MBS resin), methyl methacrylate-acrylonitrile-butadiene-styrene copolymer (MABS resin), acrylonitrile-acrylic rubber-styrene copolymer (AAS resin), acrylonitrile-ethylene propylene based rubber-styrene copolymer (AES resin) and the like, or mixtures thereof. Rubber-modified styrene resin is preferable from the viewpoint of shock resistance, wherein the rubber modified styrene resin is a polymer having particulate rubbery polymers dispersed in a matrix of a vinyl aromatic polymer and is obtained, in the presence of a rubbery polymers, through well-known bulk polymerization, bulk suspension polymerization, solution polymerization or emulsion polymerization of a mixture of monomers prepared by adding aromatic vinyl monomer, and vinyl monomer if needed.

Examples of the above-mentioned rubbery polymer include a diene rubber such as polybutadiene, poly(styrene-butadiene) and poly(acrylonitrile-butadiene), and a saturated rubber obtained by hydrogenation of the above-mentioned diene rubber; isoprene rubber; chloroprene rubber; acrylic rubber such as polybutyl acrylate; and ethylene-propylene-diene monomer terpolymer (EPDM); and the like, and a diene rubber is particularly preferable.

Examples of the aromatic vinyl monomer, which is an essential component in the graft-copolymerizable monomer mixture to be polymerized in the presence of the above-mentioned rubbery polymer, include styrene, α-methylstyrene, para-methylstyrene and the like, and styrene is the most preferable.

Examples of the vinyl monomer, which can be added as needed, include acrylonitrile, methyl methacrylate and the like.

The rubbery polymer in the rubber-modified styrene resin is 1-50 wt % and preferably 2-40 wt %. The graft-polymerizable monomer mixture is 99-50 wt % and preferably 98-60 wt %.

The polyphenylene sulfide resin (PPS) as component A-2 has a repeat unit represented by the following formula.

[Chem. 3]

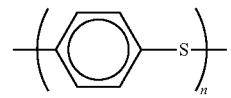

In the formula, n represents an integer of 1 or more, preferably 50-500, and more preferably 100-400. The resin may be linear or crosslinked.

Examples of a method for producing a polyphenylene sulfide resin include a method in which dichlorobenzene is subjected to reaction with sodium disulfide. A crosslinked resin can be produced by a method in which monomers are polymerized to a polymer having a low degree of polymerization, and then the polymer is partially crosslinked by heating in the presence of air to obtain a high-molecular weight polymer. A linear resin can be produced by a method in which monomers are highly polymerized during polymerization.

The polyetherimide resin (PEI) as component A-2 has a repeat unit represented by the following formula.

[Chem. 4]

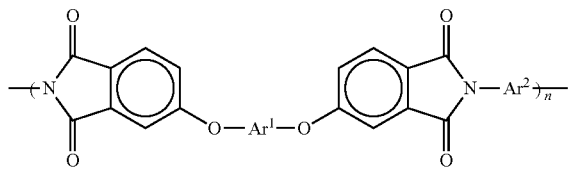

In the formula, $Ar^1$ represents an aromatic dihydroxy compound residue and $Ar^2$ represents an aromatic diamine residue. Examples of the aromatic dihydroxy compounds include aromatic dihydroxy compounds shown in the above-mentioned explanation of the polycarbonate resin, and bispenol A is particularly preferable. Examples of aromatic diamine include m-phenylenediamine, p-phenylenediamine, 4,4'-diaminodiphenyl, 3,4'-diaminodiphenyl, 4,4'-diaminodiphenyl ether, 3,4'-diaminodiphenyl ether, diaminodiphenyl methane, diaminodiphenylsulphone, diaminodiphenyl sulfide and the like.

The symbol n in the above formula represents an integer of 5-1000, and is preferably 10-500.

Besides, examples of the manufacturing method of a polyetherimide resin is described in U.S. Pat. No. 3,847,867, U.S. Pat. No. 3,847,869, U.S. Pat. No. 3,850,885, U.S. Pat. No. 3,852,242, U.S. Pat. No. 3,855,178 and the like.

Among the above-mentioned various kinds of components A-2, a polyester resin (PEst), a polyphenylene ether resin (PPE), a polycarbonate resin (PC), a polyamide resin (PA) or a styrenic resin is preferable.

The organophosphorus compound used as component B in the present invention is represented by the following formula (1).

[Chem. 5]

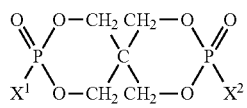

(wherein $X^1$ and $X^2$ are the same or different and represent alkyl groups substituted with aromatic groups represented by the following formula (2).)

[Chem. 6]

(wherein AL represents a branched or straight aliphatic hydrocarbon group having 1-5 carbon atoms, and Ar represents a phenyl group, a naphthyl group, or an anthryl group each optionally substituted. The symbol n represents an integer of 1 to 3, and Ar can be bonded to any carbon atom in AL.)

The organophosphorus compound is preferably a phosphorus compound represented by the following formula (3) and (4).

[Chem. 7]

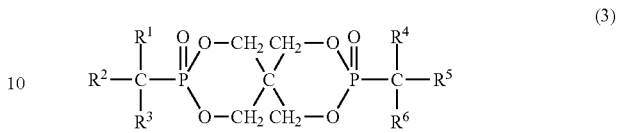

In the above formula (3), $R^2$ and $R^5$ may be the same or different and represent a phenyl group, a naphthyl group or an anthryl group each optionally substituted. $R^2$ and $R^5$ preferably represent a phenyl group, optionally have a substituent at a part except the part that is bonded to phosphorus via a carbon atom on the aromatic ring, and represent an aryl group having 6-14 carbon atoms, wherein methyl group, ethyl group, propyl group (including an isomer), butyl group (including an isomer) or their bonding group to the aromatic ring are (bonded) through oxygen, sulfur or an aliphatic hydrocarbon group having 1-4 carbon atoms. $R^1$, $R^3$, $R^4$ and $R^6$ may be the same or different and represent a substituent selected from hydrogen atom, branched or straight alkyl group having 1-4 carbon atoms, phenyl group, naphthyl group and anthryl group, wherein the preceding aryl groups are all optionally substituted. Preferable examples of $R^1$, $R^3$, $R^4$, and $R^6$ include hydrogen atom, methyl group, ethyl group and phenyl group.

[Chem. 8]

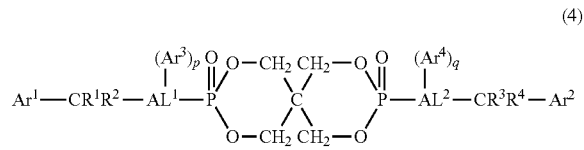

In the above formula (4), $Ar^1$ and $Ar^2$ may be the same or different and represent a phenyl group, a naphthyl group or an anthryl group, wherein the preceding aromatic rings are optionally substituted. $R^1$, $R^2$, $R^3$ and $R^4$ may be the same or different and represent a hydrogen atom, an aliphatic hydrocarbon group having 1-3 carbon atoms, or a phenyl group, a naphthyl group or an anthryl group, wherein the preceding aromatic rings are optionally substituted. $R^1$, $R^2$, $R^3$ and $R^4$ preferably represent a phenyl group, optionally have a substituent at a part except the part that is bonded to phosphorus via a carbon atom on the aromatic ring, and are an aryl group having 6-14 carbon atoms, wherein methyl group, ethyl group, propyl group (including an isomer), butyl group (including an isomer) or their bonding group to the aromatic ring are (bonded) through oxygen, sulfur or an aliphatic hydrocarbon group having 1-4 carbon atoms.

In the above formula (4), preferable specific examples of $Ar^1$ and $Ar^2$ include phenyl group, cresyl group, xylyl group, trimethyl phenyl group, 4-phenoxyphenyl group, cumyl group, naphthyl group, 4-benzylphenyl group and the like, and phenyl group is particularly preferable.

In the above formula (4), $AL^1$ and $AL^2$ may be the same or different and represent a branched or straight aliphatic hydrocarbon group having 1-4 carbon atoms, preferably 1-3 carbon atoms, and preferably in particular 1-2 carbon atoms.

In the above formula (4), preferable specific examples of $AL^1$ and $AL^2$ include methylene group, ethylene group, ethylidene group, trimethylene group, propylidene group, isopropylidene group and the like, and methylene group, ethylene group and ethylidene group are particularly preferable.

In the above formula (4), $Ar^3$ and $Ar^4$ may be the same or different and represent a phenyl group, a naphthyl group or an anthryl group, wherein the preceding aromatic rings are optionally substituted. $Ar^3$ and $Ar^4$ preferably represent a phenyl group, optionally have a substituent at a part except the part that is bonded to phosphorus via a carbon atom on the aromatic ring, and are an aryl group having 6-14 carbon atoms, wherein methyl group, ethyl group, propyl group (including an isomer), butyl group (including an isomer) or their bonding group to the aromatic ring are (bonded) through oxygen, sulfur or an aliphatic hydrocarbon group having 1-4 carbon atoms.

In the above formula (4), symbols p and q represent an integer of 0 to 3, and $Ar^3$ and $Ar^4$ can be bonded to any carbon atom in $AL^1$ and $AL^2$, respectively. Preferably p and q are 0 or 1, and preferably in particular 0.

The organophosphorus compound (component B) represented by the formula (1) exhibits an extremely excellent flame retardant effect on the resin. As far as the present inventors know, conventionally, in imparting flame retardancy of the resin without use of halogen, imparting flame retardancy by use of a small amount of a flame retardant was difficult and indeed, had a lot of practical problems.

According to the present invention, however, the organophosphorus compound (component B) surprisingly achieves flame retardancy of the resin easily without impairing characteristics inherent to the resin when used singly in a small amount.

In the present invention, it is naturally possible to blend a phosphorus compound other than component B, a fluorine-containing resin, or other additives in addition to component B in order to reduce the proportion of component B to be used, to improve the flame retardancy of a molded article, to improve the physical properties of the molded article, to enhance the chemical properties of the molded article, or for other purposes.

The organophosphorus compound (component B) as a flame retardant in the flame-retardant resin of the present invention is represented by the above formula (1), and a typical compound is most preferably at least one kind of compound selected from a group of the compounds represented by the following formulas (1-a), (1-b), (1-c) and (1-d).

[Chem. 9]

(1-a)

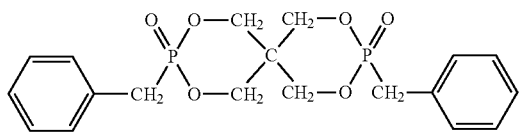

[Chem. 10]

(1-b)

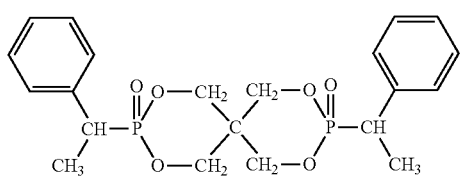

[Chem. 11]

(1-c)

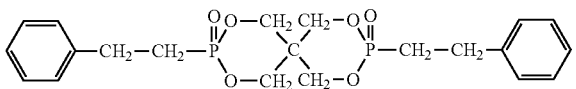

[Chem. 12]

(1-d)

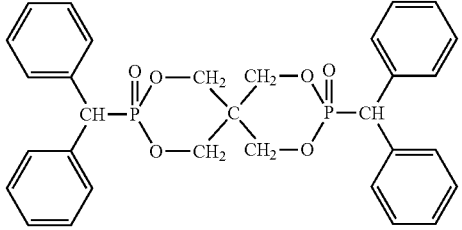

Subsequently, a method for synthesizing the organophosphorus compound (component B) in the present invention will be described. Component B may be those produced by a method other than the method described below.

Component B can be obtained by subjecting, for example, pentaerythritol to reaction with phosphorus trichloride, subsequently treating the oxidized reactant with an alkali metal compound such as sodium methoxide, and then, subjecting the treated reactant to reaction with an aralkyl halide.

Component B can be obtained also by a method in which pentaerythritol is subjected to reaction with an aralkyl phosphonate dichloride or a method in which a compound obtained by reaction of pentaerythritol with phosphorus trichloride is subjected to reaction with an aralkyl alcohol and the reactant is subsequently subjected the Arbuzov rearrangement at a high temperature. The latter reaction is disclosed in, for example, U.S. Pat. No. 3,141,032, Japanese Unexamined Patent Application Publication No. 54-157156, and Japanese Unexamined Patent Application Publication No. 53-39698.

A specific method for synthesizing component B will be described hereinbelow. This synthesis method is intended for illustration purposes only, and component B used in the present invention may be synthesized not only by these synthesis methods but also by their modification and other synthesis methods. A more specific synthesis method will be described in the preparation example described below.

(I) Organophosphorus Compound (1-a) in Component B;
Pentaerythritol is subjected to reaction with phosphorus trichloride and then oxidized with tertiary butanol. The reactant obtained is treated with sodium methoxide and subjected to reaction with benzyl bromide to obtain the compound.

(II) Organophosphorus Compound (1-b) in Component B;
Pentaerythritol is subjected to reaction with phosphorus trichloride and then oxidized with tertiary butanol. The reactant obtained is treated with sodium methoxide and subjected to reaction with 1-phenylethyl bromide to obtain the compound.

(III) Organophosphorus Compound (1-c) in Component B;
Pentaerythritol is subjected to reaction with phosphorus trichloride and then oxidized with tertiary butanol. The reactant obtained is treated with sodium methoxide and subjected to reaction with 2-phenylethyl bromide to obtain the compound.

(IV) Organophosphorus Compound (1-d) in Component B;

Pentaerythritol is subjected to reaction with diphenylmethylphosphonic dichloride to obtain the compound.

In an alternative method, pentaerythritol is subjected to reaction with phosphorus trichloride. Heat treatment of the reaction product between the product obtained and diphenylmethyl alcohol in the presence of a catalyst can yield the compound.

As the aforementioned component B, those having preferably an acid value of 0.7 mgKOH/g or less, more preferably 0.5 mg KOH/g or less, still more preferably 0.4 mgKOH/g or less, particularly preferably 0.3 mgKOH/g or less, and most preferably 0.2 mgKOH/g or less are used. By using a component B having an acid value in this range, a molded article having excellent flame retardancy and hue can be provided as well as a molded article having an excellent thermal stability can be provided. A component B having an acid value of 0.1 mgKOH/g or less is most preferable. The acid value herein means the amount of KOH (mg) necessary for neutralizing the acid component in 1 g of the sample (component B).

Component B has a 10 wt % heat weight loss temperature of preferably 350° C. or more, more preferably 355° C. or more, and still more preferably 360° C. or more. Component B having such a heat weight loss temperature has excellent thermal stability, vaporizes little when a resin composition is produced, and thus a resin composition having stable performance can be obtained.

As component B, those having a HPLC purity of preferably at least 90%, more preferably at least 95%, and still more preferably at least 99% are used. Component B having such a high purity is preferred because the flame retardancy, hue, and thermal stability of molded articles therefrom are excellent. The HPLC purity of component B can be effectively measured by using the following method.

The column used was Develosil ODS-7 300 mm×4 mmϕ manufactured by Nomura Chemical Co., Ltd., and the column temperature was set at 40° C. The solvent used was a 6:4 (volume ratio) mixed solution of acetonitrile and water, and 5 µl of the solution was injected. The detector used was UV-260 nm.

The method of removing impurities contained in component B is not particularly limited but a method in which repulp cleaning (cleaning with a solvent and filtration are repeated several times) is carried out with a solvent such as water and methanol is the most effective and economically advantageous.

Component B is blended in the range of 1 to 100 parts by weight per 100 parts by weight of the resin component (component A), preferably 5 to 90 parts by weight, more preferably 10 to 70 parts by weight, still more preferably 10 to 50 parts by weight, and particularly preferably 15 to 30 parts by weight. The suitable range for the proportion of component B to be blended depends on a desired flame retardancy level, the type of the resin component (component A) and the like. Other components, even if the components may be other than component A and component B constituting these compositions, can be used as required as long as the object of the present invention is not impaired. It is also possible to change the amount of component B to be blended by using other flame retardant, flame retardant aid, and fluorine-containing resin. In many cases, it is possible to reduce the proportion of component B to be blended by using such components.

The flame retardant resin composition of the present invention has a total light transmittance in a molded article having a thickness of 2 mm of preferably 90% or more, more preferably 91% or more, still more preferably 91.5% or more, and particularly preferably 92% or more. A higher total light transmittance is preferable because such a composition can be suitably used as a raw material for various molded articles for which transparency is required.

In the present invention, decrease in the pencil hardness of the flame retardant resin composition of the present invention is preferably within one rank, compared with the pencil hardness of only the resin component (component A). A smaller decrease in the pencil hardness is preferable because the composition can be suitably used as a raw material for various molded articles for which surface hardness is required.

For preparation of the flame-retardant resin composition of the present invention, there is preferably adopted a method in which a resin component (component A), an organophosphorus compound (component B) and other components as required are premixed by using a mixer such as a V type blender, a super mixer, a super floater and a Henschel mixer, and the premixed mixture is supplied into a kneader and melt-kneaded. As the kneader, various melt mixers such as a kneader, a single-screw or twin-screw extruder can be used. Especially, there is preferably used a method in which a resin composition is melted by using a twin-screw extruder, the liquid component is injected with a side feeder, the mixture is extruded and the extrudate is pelletized with a pelletizer.

The flame retardant resin composition of the present invention substantially contains no halogen, has a very high flame retardant performance, and is useful as a material for molding various molded articles such as components for home electric appliances, electrical/electronic components, automotive parts, machine/mechanism elements, cosmetics containers and the like. Specifically, the composition can be suitably used for breaker components, switch components, motor components, ignition coil cases, power plugs, power outlets, coil bobbins, connectors, relay cases, fuse cases, flyback transformer components, focus block components, distributor caps, harness connectors and the like. Additionally, the composition is useful for housings, casings or chassis that are progressively becoming thinner, for example, housings, casings or chassis for electrical/electronic products (for example, home appliances/office automation apparatuses such as telephones, personal computers, printers, fax machines, copiers, televisions, videocassette recorders, and audio instruments and components thereof). The composition is also useful for machine/mechanism elements of home appliances/office automation apparatuses such as printer enclosures, fusing units, and fax machines, for which excellent heat resistance and flame retardancy are required. Particularly, the composition is useful for shade for lighting fixtures such as LEDs and the like.

Examples of a molding process include, but not particularly limited to, injection molding, blow molding, and press molding. Preferably, a pellet resin composition is produced by injection molding using an injection molding machine.

EXAMPLES

The present invention will be described with reference to Examples, while the present invention is not intended to be limited to these Examples. It should be noted that evaluation was conducted in accordance with the following method.
(1) Flame Retardancy (UL-94 Evaluation)

Flame retardancy was evaluated by using test pieces having a thickness of 1/16 inches (1.6 mm) and in compliance with the vertical flame test specified in United States UL standards UL-94 as the evaluation measure of flame retardancy. Specimens in which burning stops within 30 seconds after flame was removed were taken as V-2, and specimens not satisfying the evaluation criteria were taken as not V.

(2) Acid Value

Measurement was conducted in compliance with JIS-K-3504.

(3) HPLC Purity

The column used was Develosil ODS-7 300 mm×4 mm φ, manufactured by Nomura chemical Co., Ltd., and the column temperature was set at 40° C. The solvent used was a 6:4 (volume ratio) mixed solution of acetonitrile and water, and 5 μL of the solution was injected. Detection was performed by measuring absorption at UV-260 nm.

(4) 10 wt % Heat Weight Loss Temperature

In compliance with JIS-K-7120, the 10 wt % heat weight loss temperature was calculated from a TG curve measured at a temperature rising rate of 20° C./min under a nitrogen flow.

(5) Melt Flow Rate (MFR)

Measurement was conducted in compliance with JIS-K-7210 at 230° C. under a load of 3.8 kg.

(6) Total Light Transmittance

Measurement was conducted in compliance with JIS-K-7361 on specimens having a thickness of 2 mm.

(7) Haze

Measurement was conducted in compliance with JIS-K-7136 on specimens having a thickness of 2 mm.

(8) Charpy Impact Strength

Notched Charpy impact strength measurement was conducted in compliance with JIS-K-7111.

(9) Pencil Hardness

Measurement was conducted in compliance with JIS-K-5600-5-4 under a load of 750 g. The rank of pencil hardness increases in the order of 6B, 5B, 4B, 3B, 2B, B, HB, F, H, 2H, 3H, 4H, 5H, and 6H. The case where the hardness decreased by one rank below that of the resin component only was defined as "decrease of the pencil hardness is one rank".

Preparation Example 1

Preparation of 2,4,8,10-tetraoxa-3,9-diphosphaspiro[5.5]undecane-3,9-dibenzyl-3,9-dioxide (FR-1)

To a reaction vessel equipped with a thermometer, a condenser, and a dropping funnel, 816.9 g (6.0 mol) of pentaerythritol, 19.0 g (0.24 mol) of pyridine and 2250.4 g (24.4 mol) of toluene were placed and the mixture was stirred. To the reaction vessel, 1651.8 g (12.0 mol) of phosphorus trichloride was added by using the dropping funnel. After addition was finished, the mixture was stirred under heating at 60° C. After the reaction, the mixture was cooled to room temperature. To the product obtained, 26.50 parts of methylene chloride was added, and 889.4 g (12.0 mol) of tertiary butanol and 150.2 g (1.77 mol) of methylene chloride were added dropwise with ice-cooling. The crystals obtained were washed with toluene and methylene chloride and filtered. The filtered residue obtained was dried at 80° C. and $1.33 \times 10^2$ Pa for 12 hours to obtain 1341.1 g (5.88 mol) of a white solid. The solid obtained was identified with $^{31}$P and $^1$HNMR spectra to be 2,4,8,10-tetraoxa-3,9-diphosphaspiro[5.5]undecane-3,9-dihydro-3,9-dioxide.

To a reaction vessel equipped with a thermometer, a condenser and a dropping funnel, 1341.0 g (5.88 mol) of 2,4,8,10-tetraoxa-3,9-diphosphaspiro[5.5]undecane-3,9-dihydro-3,9-dioxide obtained and 6534.2 g (89.39 mol) of DMF were placed and the mixture was stirred. To the reaction vessel, 648.7 g (12.01 mol) of sodium methoxide was added under ice-cooling. After 2 hours of stirring with ice-cooling, the mixture was stirred at room temperature for 5 hours. After DMF was distilled off, 2613.7 g (35.76 mol) of DMF was added, and to the reaction mixture, 2037.79 g (11.91 mol) of benzyl bromide was added dropwise with ice-cooling. After 3 hours of stirring with ice-cooling, DMF was distilled off, and 8 L of water was added. A precipitated solid was filtered off and washed twice with 2 L of water. The crude purified product obtained and 4 L of methanol were placed in a reaction vessel equipped with a condenser and a stirrer, and the mixture was refluxed for about 2 hours. After cooled to room temperature, the crystals were separated by filtration and washed with 2 L of methanol. Then, the filtered residue obtained was dried at 120° C. and $1.33 \times 10^2$ Pa for 19 hours to obtain 1863.5 g (4.56 mol) of white scaly crystals. The crystals obtained were identified with $^{31}$P and $^1$H NMR spectra and elemental analysis to be 2,4,8,10-tetraoxa-3,9-diphosphaspiro[5.5]undecane-3,9-dibenzyl-3,9-dioxide. The yield was 76%, and the $^{31}$P NMR purity was 99%. Additionally, the HPLC purity measured by the method described herein was 99%. The acid value was 0.06 mgKOH/g. The 10 wt % heat weight loss temperature was 369° C.

$^1$H-NMR (DMSO-$d_6$, 300 MHz): δ7.2-7.4 (m, 10H), 4.1-4.5 (m, 8H), 3.5 (d, 4H), $^{31}$P-NMR (DMSO-$d_6$, 120 MHz): δ23.1(S), melting point: 255-256° C., elemental analysis calculated value: C, 55.89; H, 5.43, measurements: C, 56.24; H, 5.35

Preparation Example 2

Preparation of 2,4,8,10-tetraoxa-3,9-diphosphaspiro[5.5]undecane-3,9-dibenzyl-3,9-dioxide (FR-2)

A reaction vessel equipped with a stirrer, a thermometer and a condenser was filled with 22.55 g (0.055 mol) of 3,9-dibenzyloxy-2,4,8,10-tetraoxa-3,9-diphosphaspiro[5.5]undecane, 19.01 g (0.11 mol) of benzyl bromide and 33.54 g (0.32 mol) of xylene. The mixture was stirred at room temperature with a flow of dry nitrogen. Then, heating was started with an oil bath, and the mixture was heated and stirred at the reflux temperature (about 130° C.) for 4 hours. After the heating was finished, the mixture was cooled down to room temperature. After addition of 20 mL of xylene, the mixture was further stirred for 30 minutes. The precipitated crystals were separated by filtration and washed twice with 20 mL of xylene. The crude purified product obtained and 40 mL of methanol were placed in a reaction vessel equipped with a condenser and a stirrer and the mixture was refluxed for about 2 hours. After cooled to room temperature, the crystals were separated by filtration and washed with 20 mL of methanol. Then, the filtered residue obtained was dried at 120° C. and $1.33 \times 10^2$ Pa for 19 hours to obtain white scaly crystals. The product was identified with mass spectrometry, $^1$H, $^{31}$P nuclear magnetic resonance spectroscopy, and elemental analysis to be bis-benzyl pentaerythritol diphosphonate. The amount produced was 20.60 g, the yield was 91%, and the $^{31}$P NMR purity was 99%. Additionally, the HPLC purity measured by the method described herein was 99%. The acid value was 0.05 mgKOH/g. The 10 wt % heat weight loss temperature was 370° C.

$^1$H-NMR (DMSO-$d_6$, 300 MHz): δ 7.2-7.4 (m, 10H), 4.1-4.5 (m, 8H), 3.5 (d, 4H), $^{31}$P-NMR (DMSO-$d_6$, 120 MHz): δ 23.1 (S), melting point: 257° C.

Preparation Example 3

Preparation of 2,4,8,10-tetraoxa-3,9-diphosphaspiro[5.5]undecane-3,9-diα-methylbenzyl-3,9-dioxide (FR-3)

To a reaction vessel equipped with a thermometer, a condenser and a dropping funnel, 816.9 g (6.0 mol) of pentaerythritol, 19.0 g (0.24 mol) of pyridine, and 2250.4 g (24.4 mol) of toluene were placed and the mixture was stirred. To the reaction vessel, 1651.8 g (12.0 mol) of phosphorus trichloride was added by using the dropping funnel. After addition was finished, the mixture was stirred under heating at 60° C. After the reaction, the mixture was cooled to room temperature. To the product obtained, 5180.7 g (61.0 mol) of methylene chloride was added, and 889.4 g (12.0 mol) of tertiary butanol and 150.2 g (1.77 mol) of methylene chloride were added dropwise with ice-cooling. The crystals obtained were washed with toluene and methylene chloride and filtered. The filtered residue obtained was dried at 80° C. and $1.33 \times 10^2$ Pa for 12 hours to obtain 1341.1 g (5.88 mol) of a white solid. The solid obtained was identified with $^{31}$P and $^1$H NMR spectra to be 2,4,8,10-tetraoxa-3,9-diphosphaspiro[5.5]undecane-3,9-dihydro-3,9-dioxide.

To a reaction vessel equipped with a thermometer, a condenser and a dropping funnel, 1341.0 g (5.88 mol) of 2,4,8,10-tetraoxa-3,9-diphosphaspiro[5.5]undecane-3,9-dihydro-3,9-dioxide obtained and 6534.2 g (89.39 mol) of DMF were placed and the mixture was stirred. To the reaction vessel, 648.7 g (12.01 mol) of sodium methoxide was added under ice-cooling. After 2 hours of stirring with ice-cooling, the mixture was stirred at room temperature for 5 hours. After DMF was distilled off, 2613.7 g (35.76 mol) of DMF was added, and 2204.06 g (11.91 mol) of 1-phenylethyl bromide was added to the reaction mixture dropwise with ice-cooling. After 3 hours of stirring with ice-cooling, DMF was distilled off and 8 L of water was added. The precipitated solid was filtered off and washed twice with 2 L of water. The crude purified product obtained and 4 L of methanol were placed in a reaction vessel equipped with a condenser and a stirrer and the mixture was refluxed for about 2 hours. After cooled to room temperature, the crystals were separated by filtration and washed with 2 L of methanol. Then, the filtered residue obtained was dried at 120° C. and $1.33 \times 10^2$ Pa for 19 hours to obtain 1845.9 g (4.23 mol) of white scaly crystals. The solid obtained was identified with $^{31}$P and $^1$H NMR spectra and elemental analysis to be 2,4,8,10-tetraoxa-3,9-diphosphaspiro[5.5]undecane-3,9-diα-methylbenzyl-3,9-dioxide. The $^{31}$P NMR purity was 99%. Additionally, the HPLC purity measured by the method described herein was 99%. The acid value was 0.03 mgKOH/g. The 10 wt % heat weight loss temperature was 351° C.

$^1$H-NMR (CDCl$_3$, 300 MHz): δ 7.2-7.4 (m, 10H), 4.0-4.2 (m, 4H), 3.4-3.8 (m, 4H), 3.3 (qd, 4H), 1.6 (ddd, 6H), $^{31}$P-NMR (CDCl$_3$, 120 MHz): δ 28.7(S), melting point: 190-210□, elemental analysis calculated value: C, 57.80; H, 6.01, measurements: C, 57.83; H, 5.96.

Preparation Example 4

Preparation of 2,4,8,10-tetraoxa-3,9-diphosphaspiro[5.5]undecane-3,9-di(2-phenylethyl)-3,9-dioxide (FR-4)

To a reaction vessel equipped with a thermometer, a condenser and a dropping funnel, 816.9 g (6.0 mol) of pentaerythritol, 19.0 g (0.24 mol) of pyridine and 2250.4 g (24.4 mol) of toluene were placed and the mixture was stirred. To the reaction vessel, 1651.8 g (12.0 mol) of phosphorus trichloride was added by using the dropping funnel. After addition was finished, the mixture was stirred under heating at 60° C. After the reaction, the mixture was cooled to room temperature. To the product obtained, 5180.7 g (61.0 mol) of methylene chloride was added, and 889.4 g (12.0 mol) of tertiary butanol and 150.2 g (1.77 mol) of methylene chloride were added dropwise with ice-cooling. The crystals obtained were washed with toluene and methylene chloride and filtered. The filtered residue obtained was dried at 80° C. and $1.33 \times 10^2$ Pa for 12 hours to obtain 1341.1 g (5.88 mol) of a white solid. The solid obtained was identified with $^{31}$P and $^1$H NMR spectra as 2,4,8,10-tetraoxa-3,9-diphosphaspiro[5.5]undecane-3,9-dihydro-3,9-dioxide.

To a reaction vessel equipped with a thermometer, a condenser and a dropping funnel, 1341.0 g (5.88 mol) of 2,4,8,10-tetraoxa-3,9-diphosphaspiro[5.5]undecane-3,9-dihydro-3,9-dioxide obtained and 6534.2 g (89.39 mol) of DMF were placed and the mixture was stirred. To the reaction vessel, 648.7 g (12.01 mol) of sodium methoxide was added under ice-cooling. After 2 hours of stirring with ice-cooling, the mixture was stirred at room temperature for 5 hours. After DMF was distilled off, 2613.7 g (35.76 mol) of DMF was added, and 2183.8 g (11.8 mol) of (2-bromoethyl)benzene was added to the reaction mixture dropwise with ice-cooling. After 3 hours of stirring with ice-cooling, DMF was distilled off, and 8 L of water was added. The precipitated solid was filtered off and washed twice with 2 L of water. The crude purified product obtained and 4 L of methanol were placed in a reaction vessel equipped with a condenser and a stirrer and the mixture was refluxed for about 2 hours. After cooled to room temperature, the crystals were separated by filtration and washed with 2 L of methanol. Then, the filtered residue obtained was dried at 120° C. and $1.33 \times 10^2$ Pa for 19 hours to obtain 1924.4 g (4.41 mol) of a white powder. The solid obtained was identified with $^{31}$P and $^1$H NMR spectra and elemental analysis to be 2,4,8,10-tetraoxa-3,9-diphosphaspiro[5.5]undecane-3,9-di(2-phenylethyl)-3,9-dioxide. The $^{31}$P NMR purity was 99%. Additionally, the HPLC purity measured by the method described herein was 99%. The acid value was 0.03 mgKOH/g. The 10 wt % heat weight loss temperature was 393° C.

$^1$H-NMR (CDCl$_3$, 300 MHz): δ 7.1-7.4 (m, 10H), 3.85-4.65 (m, 8H), 2.90-3.05 (m, 4H), 2.1-2.3 (m, 4H), $^{31}$P-NMR (CDCl$_3$, 120 MHz): δ 31.5(S), melting point: 245-246□, elemental analysis calculated value: C, 57.80; H, 6.01, measurements: C, 58.00; H, 6.07.

Preparation Example 5

Preparation of 2,4,8,10-tetraoxa-3,9-diphosphaspiro[5.5]undecane-3,9-di(2-phenylethyl)-3,9-dioxide (FR-5)

A reaction vessel equipped with a stirrer, a thermometer and a condenser was filled with 436.4 g (1.0 mol) of 3,9-di(2-phenylethoxy)-2,4,8,10-tetraoxa-3,9-diphosphaspiro[5.5]undecane and 370.1 g (2.0 mol) of 2-phenylethyl bromide. The mixture was stirred at room temperature with a flow of dry nitrogen. Then, heating was started with an oil bath, and the mixture was maintained at an oil bath temperature of 180° C. for 10 hours. Thereafter, the oil bath was removed, and the mixture was cooled to room temperature. To the white solid reactant obtained, 2000 mL of methanol was added. After the mixture was stirred and washed, a white powder was filtered off with a glass filter. Then, the filter-separated white powder and 4000 mL of methanol were placed in a reaction vessel equipped with a condenser and a stirrer and the mixture was refluxed for about 2 hours. After cooled to room temperature, the crystals were separated by filtration and washed with 2000 mL of methanol. The white powder obtained was dried at 100 Pa and 120° C. for 8 hours to obtain 362.3 g of 2,4,8,10-tetraoxa-3,9-diphosphaspiro[5.5]undecane-3,9-di(2-phenylethyl)-3,9-dioxide. The product was identified with mass spectroscopy, $^1$H, $^{31}$P nuclear magnetic resonance spectroscopy, and elemental analysis to be 2,4,8,10-tetraoxa-3,9-diphosphaspiro[5.5]undecane-3,9-di(2-phenylethyl)-3,9-dioxide. The yield was 83%, the HPLC purity was 99.3%, and the acid value was 0.41 KOHmg/g. The 10 wt % heat weight loss temperature was 389° C.

$^1$H-NMR (CDCl$_3$, 300 MHz): δ 7.1-7.4 (m, 10H), 3.85-4.65 (m, 8H), 2.90-3.05 (m, 4H), 2.1-2.3 (m, 4H), $^{31}$P-NMR (CDCl$_3$, 120 MHz): δ 31.5(S), melting point: 245-246□.

Preparation Example 6

Preparation of 2,4,8,10-tetraoxa-3,9-diphosphaspiro[5,5]undecane-3,9-bis(diphenylmethyl)-3,9-dioxide (FR-6)

To a 10 L three-neck flask equipped with a stirrer, a stirrer blade, a reflux condenser and a thermometer, 2058.5 g (7.22 mol) of diphenylmethylphosphonic dichloride, 468.3 g (3.44 mol) of pentaerythritol, 1169.4 g (14.8 mol) of pyridine and 8200 g of chloroform were placed, and the mixture was heated to 60° C. under a nitrogen flow and stirred for 6 hours. After the reaction was finished, chloroform was replaced by methylene chloride. To the reaction mixture, 6 L of distilled water was added to precipitate a white powder. The powder was filtered off by suction filtration. The white product obtained was washed with methanol and then dried at 100° C. and 1.33×10$^2$ Pa for 10 hours to obtain 1156.2 g of a white solid. The solid obtained was identified with $^{31}$P-NMR and $^1$H-NMR spectra and elemental analysis to be 2,4,8,10-tetraoxa-3,9-diphosphaspiro[5.5]undecane-3,9-bis(diphenylmethyl)-3,9-dioxide. The $^{31}$P-NMR purity was 99%. Additionally, the HPLC purity measured by the method described herein was 99%. The acid value was 0.3 mgKOH/g. The 10 wt % heat weight loss temperature was 398° C.

$^1$H-NMR (DMSO-d 6, 300 MHz): δ 7.20-7.60 (m, 20H), 5.25 (d, 2H), 4.15-4.55 (m, 8H), $^{31}$P-NMR (DMSO-d6, 120 MHz): δ 20.9, melting point: 265□, elemental analysis calculated value: C, 66.43; H, 5.39, measurements: C, 66.14; H, 5.41.

Preparation Example 7

Preparation of 2,4,8,10-tetraoxa-3,9-diphosphaspiro[5,5]undecane-3,9-bis(diphenylmethyl)-3,9-dioxide (FR-7)

A three-neck flask was equipped with a stirrer, a thermometer and a condenser. Under a nitrogen flow, 40.4 g (0.072 mol) of 3,9-bis(diphenylmethoxy)-2,4,8,10-tetraoxa-3,9-diphosphaspiro[5.5]undecane, 35.5 g (0.14 mol) of diphenylmethyl bromide and 48.0 g (0.45 mol) of xylene were placed in this flask. The mixture was heated and stirred at the reflux temperature (about 130° C.) for 3 hours. After the heating was finished, the mixture was cooled down to room temperature. After addition of 30 mL of xylene, the mixture was further stirred for 30 minutes. The precipitated crystals were separated by filtration and washed twice with 30 mL of xylene. The crude purified product obtained and 100 mL of methanol was placed in an eggplant flask. The flask was equipped with a condenser, and the mixture was refluxed for about 1 hour. After cooled to room temperature, the crystals were separated by filtration, washed twice with 50 mL of methanol, and dried under reduced pressure at 120° C. The solid obtained was identified with $^{31}$P and $^1$H NMR spectra and elemental analysis to be 2,4,8,10-tetraoxa-3,9-diphosphaspiro[5,5]undecane-3,9-bis(diphenylmethyl)-3,9-dioxide. The solid obtained was a white powder, the amount produced was 36.8 g, and the yield was 91%. The $^{31}$PNMR purity was 99%. Additionally, the HPLC purity measured by the method described herein was 99%. The acid value was 0.07 mgKOH/g. The 10 wt % heat weight loss temperature was 401° C.

$^1$H-NMR (DMSO-d$_6$, 300 MHz): δ 7.2-7.6 (m, 20H), 6.23 (d, J=9 Hz, 2H), 3.89-4.36 (m, 6H), 3.38-3.46 (m, 2H), $^{31}$P-NMR (CDCl$_3$, 120 MHz): δ20.9 (S), melting point: 265□, elemental analysis calculated value: C, 66.43; H, 5.39, measurements: C, 66.14; H, 5.41.

The following components were used for each Examples and Comparative examples.

(I) Acrylic Resin (Component A)

(1) A commercial acrylic resin (ACRYPET VH001 manufactured by Mitsubishi Rayon Co., Ltd.) (hereinafter referred to as PMMA-1) was used. The MFR value measured at 230° C. under a load of 3.8 kg was 2.0 g/10 min.

(2) A commercial acrylic resin (ACRYPET MD001 manufactured by Mitsubishi Rayon Co., Ltd.) (hereinafter referred to as PMMA-2) was used. The MFR value measured at 230° C. under a load of 3.8 kg was 6.0 g/10 min.

(3) A commercial acrylic resin (ACRYPET MF001 manufactured by Mitsubishi Rayon Co., Ltd.) (hereinafter referred to as PMMA-3) was used. The MFR value measured at 230° C. under a load of 3.8 kg was 14.0 g/10 min.

(4) A commercial acrylic resin (DELPET 720V manufactured by Asahi Kasei chemicals Co., Ltd.) (hereinafter referred to as PMMA-4) was used. The MFR value measured at 230° C. under a load of 3.8 kg of was 25.0 g/10 min.

(Other) Polyphenylene ether (XYRON P-402 manufactured by Asahi Chemical Industry Co., Ltd.) (hereinafter referred to as PPE) was used.

(II) Organophosphorus Compound (Component B)

(1) 2,4,8,10-tetraoxa-3,9-diphosphaspiro[5,5]undecane-3,9-dibenzyl-3,9-dioxide synthesized in preparation example 1 {Phosphorus compound represented by the above-mentioned formula (1-a) (hereinafter referred to as FR-1)}

(2) 2,4,8,10-tetraoxa-3,9-diphosphaspiro[5,5]undecane-3,9-dibenzyl-3,9-dioxide synthesized in preparation example 2 {Phosphorus compound represented by the above-mentioned formula (1-a) (hereinafter referred to as FR-2)}

(3) 2,4,8,10-tetraoxa-3,9-diphosphaspiro[5,5]undecane-3,9-diα-methylbenzyl-3,9-dioxide synthesized in preparation example 3 {Phosphorus compound represented by the above-mentioned formula (1-b) (hereinafter referred to as FR-3)}

(4) 2,4,8,10-tetraoxa-3,9-diphosphaspiro[5,5]undecane-3,9-di(2-phenylethyl)-3,9-dioxide synthesized in preparation example 4 {Phosphorus compound represented by the above-mentioned formula (1-c) (hereinafter referred to as FR-4)}

(5) 2,4,8,10-tetraoxa-3,9-diphosphaspiro[5,5]undecane-3,9-di(2-phenylethyl)-3,9-dioxide synthesized in preparation example 5 {Phosphorus compound represented by the above-mentioned formula (1-c) (hereinafter referred to as FR-5)}

(6) 2,4,8,10-tetraoxa-3,9-diphosphaspiro[5,5]undecane-3,9-bis(diphenylmethyl)-3,9-dioxide synthesized in preparation example 6 {Phosphorus compound represented by the above-mentioned formula (1-d) (hereinafter referred to as FR-6)}

(7) 2,4,8,10-tetraoxa-3,9-diphosphaspiro[5,5]undecane-3,9-bis(diphenylmethyl)-3,9-dioxide synthesized in preparation example 7 {Phosphorus compound represented by the above-mentioned formula (1-d) (hereinafter referred to as FR-7)}

(III) Other Organophosphorus Compounds (1) 1,3-phenylenebis[di(2,6-dimethylphenyl)phosphate] (PX-200 manufactured by DAIHACHI CHEMICAL INDUSTRY Co., Ltd.) (hereinafter referred to as PX-200) was used.

(2) A commercial phosphorus flame retardant (Exolit OP1240 manufactured by Clariant) (hereinafter referred to as Exolit) was used.

Examples 1-14 and Comparative Examples 1-9

Components listed on Tables 1 and 2 were each blended in the amount listed in Tables 1 and 2 (parts by weight) in a tumbler and pelletized by a 15 mmφ twin-screw extruder (KZW15 manufactured by TECHNOVEL CORPORATION). The pellets obtained were dried by a hot air dryer, and the dried pellets were molded in an injection molding machine (J75EIII manufactured by The Japan Steel Works, LTD.). The results of evaluation by using a molded sheet are shown in Tables 1 and 2.

TABLE 1

| | Component | Unit | Example 1 | Example 2 | Example 3 | Example 4 | Example 5 | Example 6 | Example 7 |
|---|---|---|---|---|---|---|---|---|---|
| Composition | Component A Type | | PMMA-1 | PMMA-1 | PMMA-1 | PMMA-1 | PMMA-1 | PMMA-1 | PMMA-1 |
| | Parts by weight | | 100 | 100 | 100 | 100 | 100 | 100 | 100 |
| | Component B Type | | FR-1 | FR-2 | FR-3 | FR-4 | FR-5 | FR-6 | FR-7 |
| | Parts by weight | | 15 | 15 | 15 | 15 | 15 | 15 | 15 |
| Flame retardancy UL-94 test | Specimen thickness | mm | 1.6 | 1.6 | 1.6 | 1.6 | 1.6 | 1.6 | 1.6 |
| | UL evaluation | Rank | V-2 | V-2 | V-2 | V-2 | V-2 | V-2 | V-2 |
| Optical properties | Total light transmittance | % | 92.5 | 92.5 | 92.6 | 92.7 | 92.7 | 92.1 | 92.1 |
| | Haze | % | 0.5 | 0.5 | 0.5 | 0.5 | 0.5 | 0.6 | 0.6 |
| Charpy impact strength (notched) | | kJ/m$^2$ | 2 | 2 | 2 | 2 | 2 | 2 | 2 |
| Pencil hardness (750 g load) | | Rank | 2H | 2H | 2H | 2H | 2H | 2H | 2H |

| | Component | Unit | Example 8 | Example 9 | Example 10 | Example 11 | Example 12 | Example 13 | Example 14 |
|---|---|---|---|---|---|---|---|---|---|
| Composition | Component A Type | | PMMA-2 | PMMA-3 | PMMA-4 | PMMA-1 | PMMA-1/PPE | PMMA-1 | PMMA-1 |
| | Parts by weight | | 100 | 100 | 100 | 100 | 70/30 | 100 | 100 |
| | Component B Type | | FR-1 | FR-1 | FR-1 | FR-1/PX-200 | FR-1 | FR-1 | FR-1 |
| | Parts by weight | | 15 | 15 | 15 | 10/5 | 15 | 20 | 30 |
| Flame retardancy UL-94 test | Specimen thickness | mm | 1.6 | 1.6 | 1.6 | 1.6 | 1.6 | 1.6 | 1.6 |
| | UL evaluation | Rank | V-2 | V-2 | V-2 | V-2 | V-0 | V-2 | V-1 |
| Optical properties | Total light transmittance | % | 92.5 | 92.5 | 91.6 | 92.5 | — | 92.1 | 91.8 |
| | Haze | % | 0.5 | 0.5 | 0.6 | 0.5 | — | 0.5 | 0.6 |
| Charpy impact strength (notched) | | kJ/m$^2$ | 2 | 1 | 1 | 2 | 2 | 2 | 2 |
| Pencil hardness (750 g load) | | Rank | 2H | 2H | 2H | 2H | H | 2H | 2H |

TABLE 2

| | Component | Unit | Comparative example 1 | Comparative example 2 | Comparative example 3 | Comparative example 4 |
|---|---|---|---|---|---|---|
| Composition | Component A Type | | PMMA-1 | PMMA-2 | PMMA-3 | PMMA-4 |
| | Parts by weight | | 100 | 100 | 100 | 100 |
| | Component B Type | | — | — | — | — |
| | Parts by weight | | — | — | — | — |
| Flame retardancy UL-94 test | Specimen thickness | mm | 1.6 mm | 1.6 mm | 1.6 mm | 1.6 mm |
| | UL evaluation | Rank | not V | not V | not V | not V |

TABLE 2-continued

| | | | | | | |
|---|---|---|---|---|---|---|
| Optical properties | Total light transmittance | % | 92.9 | 92.8 | 92.9 | 91.9 |
| | Haze | % | 0.5 | 0.5 | 0.5 | 0.6 |
| Charpy impact strength (notched) | | kJ/m² | 2 | 2 | 1 | 1 |
| Pencil hardness (750 g load) | | Rank | 2H | 2H | 2H | 2H |

| Component | | Unit | Comparative example 5 | Comparative example 6 | Comparative example 7 | Comparative example 8 | Comparative example 9 |
|---|---|---|---|---|---|---|---|
| Composition | Component A | Type | PMMA-1 | PMMA-2 | PMMA-3 | PMMA-4 | PMMA-1 |
| | | Parts by weight | 100 | 100 | 100 | 100 | 100 |
| | Component B | Type | PX-200 | PX-200 | PX-200 | PX-200 | Exolit |
| | | Parts by weight | 15 | 15 | 15 | 15 | 15 |
| Flame retardancy | Specimen thickness | mm | 1.6 mm | 1.6 mm | 1.6 mm | 1.6 mm | 1.6 mm |
| UL-94 test | UL evaluation | Rank | not V | not V | not V | not V | not V |
| Optical properties | Total light transmittance | % | 92.3 | 92.1 | 92.0 | 91.1 | 60.5 |
| | Haze | % | 0.6 | 0.6 | 0.6 | 0.7 | 94.2 |
| Charpy impact strength (notched) | | kJ/m² | 1 | 1 | 1 | 1 | 1 |
| Pencil hardness (750 g load) | | Rank | 2H | 2H | 2H | 2H | 2H |

INDUSTRIAL APPLICABILITY

The flame retardant resin composition of the present invention substantially contains no halogen, has a very high flame retardant performance, and useful as a material for molding various molded articles such as components for home electric appliances, electrical/electronic components, automotive parts, machine/mechanism elements, cosmetic containers and the like.

The invention claimed is:

1. A flame retardant resin composition comprising:
1 to 100 parts by weight of (B) an organophosphorus compound (component B) per 100 parts by weight of (A) a resin component (component A) containing at least 60 wt % of an acrylic resin,
wherein the organophosphorus compound (component B) is at least one compound selected from the group consisting of compounds of the following formulas (1-a), (1-b), (1-c), and (1-d):

(1-a)

(1-b)

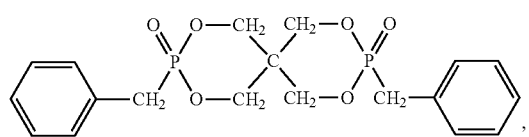

(1-c)

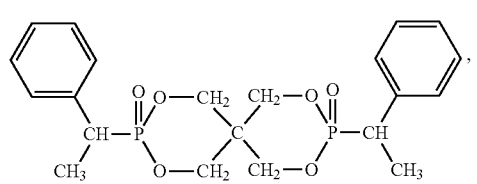

and (1-d)

2. The flame retardant resin composition according to claim 1, wherein the acrylic resin in component A is a thermoplastic acrylic resin that complies with JIS K7210 and has a melt flow rate, measured at 230° C. under a load of 3.8 kg, of 0.5 to 30 g/10 min.

3. The flame retardant resin composition according to claim 1, wherein the organophosphorus compound (component B) has an acid value of 0.7 mgKOH/g or less, an HPLC purity of 95% or more, and a 10 wt % heat weight loss temperature of 350° C. or more.

4. The flame retardant resin composition according to claim 1, wherein the composition achieves a flame retardant level of at least V-2 in accordance with the UL-94 standard, has a total light transmittance of 90% or more, and has a decrease in pencil hardness within one rank.

5. A molded article molded from the flame retardant resin composition according to claim 1.

* * * * *